3,410,903
PREPARATION OF ALIPHATIC AMINE OXIDES
Paul W. Solomon, Bartlesville, Okla., assignor to Phillips
Petroleum Company, a corporation of Delaware
No Drawing. Filed Jan. 6, 1965, Ser. No. 423,839
8 Claims. (Cl. 260—583)

ABSTRACT OF THE DISCLOSURE

N-oxide of saturated, tertiary aliphatic amine and alcohol is prepared by reacting a saturated, tertiary aliphatic amine with hydroperoxide at a temperature in the range of from about 20° C. to about 100° C. In a now preferred embodiment, water and a primary alcohol are employed as reaction medium. Among amines and hydroperoxides are tri-n-propylamine and tertiary butyl hydroperoxide. The primary alcohol selected from a group of alcohols can be methanol, ethanol, including glycols, diols and glycerols.

---

This invention relates to a process for the preparation of aliphatic amine oxides. It also relates to reaction masses obtained in a preparation of such oxides.

In one of its aspects, this invention relates to a process for the preparation of N-oxides of saturated, tertiary aliphatic amines and the concomitant production of alcohols of the formula $R_1OH$ by reaction of saturated tertiary aliphatic amines with hydroperoxides of the formula $R_1OOH$ wherein $R_1$ is a hydrocarbon radical as herein defined and wherein the reaction is effected in a reaction medium comprising water and a primary alcohol. In another of its aspects, the invention relates to the oxidation to amine-N-oxides of certain aliphatic amines in a reaction medium, comprising water and a primary alcohol, thus to obtain considerably better yields than can be obtained with water alone or with the alcohol alone.

N-oxides of long chain aliphatic amines have been developed recently for use as detergents, foaming agents, bactericides and the like. These materials show definite promise. However, their high cost relative to other materials for the same purposes or uses is a problem remaining to be solved. The compounds prepared by the process of the present invention have the same utilities, as just discussed, and are prepared at less overall cost.

Thus, I have found that N-oxides of saturated, tertiary aliphatic amines can be produced by reaction of saturated, tertiary aliphatic amines with hydroperoxides concomitantly producing alcohols as more fully described herein.

I have also found, as an important additional aspect of the invention, that the pressure of both the reaction medium water and an alcohol, as described herein, considerably and unexpectedly improves the reaction, especially respecting yield.

It is an object of this invention to prepare an aliphatic amine oxide. It is another object of this invention to provide a process for the preparation of a saturated, tertiary aliphatic amine oxide at a cost which is relatively lower than the cost heretofore encountered. It is also an object of this invention to prepare such an oxide and to concomitantly produce a second useable product. It is a further object of this invention to prepare an alcohol.

It is a further object of this invention to prepare an alcohol having the formula $R_1OH$.

Other aspects, objects and the several advantages of the invention are apparent from a study of this disclosure and the appended claims.

According to the present invention an N-oxide of a saturated, tertiary aliphatic amine and an alcohol are produced by reaction of a saturated, tertiary aliphatic amine with a hydroperoxide of the formula $R_1OOH$.

In the now preferred form of the invention, the amines which are oxidized to amine-N-oxides can be represented by the formula $(R_2)_3N$, wherein each $R_2$ is an alkyl radical containing 1–20 carbon atoms and wherein it is preferred that the total carbon atoms in the compound not exceed 30.

Some specific examples of amines of the formula $(R_2)_3N$ which can be converted to amine-N-oxides are

| | |
|---|---|
| trimethylamine | tri-n-octylamine |
| triethylamine | tri-n-decylamine |
| tri-n-propylamine | n-eicosyldiethylamine |
| methyl-di-tert-butylamine | di-n-octyltetradecylamine |
| diethylisopropyl-amine | n-dodecyldimethylamine |
| tri-n-hexylamine | n-octadecyldimethylamine | and the like.

The hydroperoxides now contemplated have the formula $R_1OOH$, as stated, and, in said formula, $R_1$ is an alkyl, alkenyl, cycloalkyl, cycloalkenyl, or aralkyl radical and combinations thereof, e.g., alkylcycloalkyl, containing from 3 to 10 carbon atoms.

Still according to the invention, the reaction is preferably effected in a reaction medium comprising water and a primary alcohol for reasons which become evident upon a study of this disclosure.

Some examples of hydroperoxides of the formula $R_1OOH$ which can be employed as oxidizing agents according to this invention are the hydroperoxides:

| | |
|---|---|
| isopropyl | tert-decyl |
| tert-butyl | cyclohexyl |
| 1-pentenyl | 2-cyclohexenyl |
| 1-pentenyl | 4-n-butylcyclohexyl |
| 2-pentenyl | cumyl |
| n-henxyl | benzyl |
| sec-octyl | 4-methylcumyl | and the like.

The oxidation process of this invention is best represented by the equation:

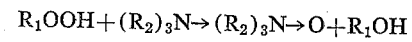

$$R_1OOH + (R_2)_3N \rightarrow (R_2)_3N \rightarrow O + R_1OH$$

The invention is now further described, its preferred form being of prime consideration, that is, the form in which the reaction medium comprises both water and the alcohol.

As stated, the process of this invention is carried out by reacting $(R_2)_3N$ amines with $R_1OOH$ hydroperoxides in a reaction media comprising water and a primary alcohol. The terminology primary alcohol is to include glycols and other polyhdric alcohols containing at least one hydroxyl group attached to a primary carbon. The alcohols which can thus be employed are alcohols containing at least one hydroxyl group attached to a primary carbon and preferably containing 1 to 6 carbon atoms, inclusive. Some specific examples of these preferred alcohols are methanol
ethanol
n-propanol
n-butanol
n-pentanol
n-hexanol
ethylene glycol
1,2-propylene glycol
1,3-propylene glycol
butane-1,4-diol
hexane-1,6-diol
glycerol and the like.

The amount of water present as one component of the reaction media preferably will be at least one mol of $H_2O$/mol of $(R_2)_3N$ compound to be converted to the N-oxide. The amount of water will generally not exceed 5 mols per mol of amine. The amount of primary alcohol present as the other component of the reaction media will generally range from .05 to 20 volumes per volume of water present, preferably from 5 to 10 volumes per volume of water. The function of the components of the reaction medium with respect to each other, though not entirely understood, is definitely demonstrated by the runs in Table I-A, i.e., runs 1–4, in that the considerably higher yields are obtained with the water and alcohol than when either of these ingredients is used alone.

The reaction is usually carried out at a temperature generally ranging from 20 to 100° C., preferably from 70–95° C. The pH of the reaction mixture will generally range from 5 to 8. The reaction time can vary widely, depending for the most part on temperature, and will range from a few minutes to several days.

The amine/hydroperoxide ratio can be widely varied. It will generally be in the range of from 20:1 to 1:20, but preferably will be in the range of from stoichiometric to an excess of the amine, i.e., 1:1 to 10:1.

At the end of the reaction, the reaction mixture is treated in a suitable manner for recovery of unreacted amine, amine-N-oxide, $R_1OH$ alcohol, and primary alcohol used as a component of the reaction media. Because of the difficulty in recovering hydroperoxide, it is preferred to operate with an excess of amine so as to at least approach complete conversion of hydroperoxide. The small amount of hydroperoxide remaining can be reduced, if desired, prior to separation and recovery of unreacted amine and products. One method for recovering these materials is to utilize distillation at moderate temperatures and high vacuum. Temperatures above 100° C. should be avoided as amine-N-oxides decompose readily at these conditions.

The amine-N-oxides are useful as detergents and foaming agents, while the alcohols are useful as intermediates for the production of esters and the like. The alcohols can also be dehydrated to olefinic hydrocarbons.

This invention is advantageous in that certain hydroperoxides can be formed readily by the oxidation of hydrocarbons. For example, isobutane can be oxidized by air blowing to form tert-butyl hydroperoxide in good yield. This material is then employed in the present process to oxidize amines and is, in turn, converted to tert-butyl alcohol. This alcohol is readily dehydrated to isobutylene. The useful products prepared with relatively cheap ingredients render the overall process of the invention quite attractive.

EXAMPLE I

A series of runs was carried out in which tri-n-propylamine was converted to the corresponding N-oxide by reaction with tert-butyl hydroperoxide according to the process of this invention with reaction media as shown in Table I.

This series of runs was carried out in a 100 ml., 3-necked flask equipped with a stirrer, condenser, and thermometer. Heat was supplied by a heating mantle. The reactants were charged to the flask and the reaction was initiated by simply warming the flask rapidly to the desired reaction temperature, 60° C. to 89° C. At the end of the desired reaction time, the entire mixture was evaporated on a Rinco Rotating Evaporator at 25° C. to 50° C. at 1 mm. Hg absolute pressure until no further product could be distilled. The overhead material was analyzed by gas-liquid chromatography. The residue, a viscous oil or pasty solid, was mixed with 40 ml. of water and extracted three times with 50 ml. portions of n-heptane to remove unreacted amine. The aqueous phase was then analyzed for amine oxide content.

Hydroperoxides remaining in the total reaction mixture (before evaporation) were determined by mixing a sample of reaction mixture, 25 ml. acetone, 2 ml. 1 N sodium hydroxide and 25 ml. .1 N $As_2O_3$ solution. The volume of reaction mixture sample used was based on estimated hydroperoxide content so as to maintain an excess of arsenite in the solution. If too much reaction mixture sample was used so that not all of the hydroperoxide was reacted, the analysis was repeated using a smaller sample. The mixture was heated to gentle boiling for 20 minutes and boiling was continued for 10 minutes with or without an air stream as conditions demanded as foaming occurred in some cases if vigorous boiling were allowed. The product was then diluted with 100 ml. of water, cooled in an ice bath, neutralized to phenolphthalein endpoint with dilute sulfuric acid. 0.5 to 1 gram of sodium bicarbonate was added, and the solution was titrated with approximately .5 N iodine to the yellow iodine endpoint or to the usual starch-iodine endpoint when it was possible to use starch. Certain of the higher molecular weight amine oxides prevented formation of the blue starch-iodine color.

The method employed for the determination of the amine oxide yield was a potentiometric titration with isopropyl alcohol/HCl reagent by the method of Metcalfe, Analytical Chemistry, 34, 1849 (1962). When free amine was present with the amine oxide, the sample was warmed in isopropanol at 55° C. for 20 minutes with 2 ml. methyl iodide to quaternize the amine. The amine oxide was then titrated.

Unconverted amine was determined by gas-liquid chromatography on a 5' long by ¼" diameter stainless steel column packed with 16.6 percent Carbowax 20M on 60–80 mesh acid-washed Chromosorb P. This chromatograph column was programmed from 50° C. at 11° C./minute. The injection port temperature was 250° C. and helium at 60 cc. per minute was used as a carrier gas.

The results of this series of runs are expressed below as Table I. In Table I, yields are all reported on the basis of hydroperoxide consumed. In all cases complete decomposition of hydroperoxide occurred unless otherwise noted.

EXAMPLE II

A series of runs was carried out in which tertiary amines were converted to amine oxides by the reaction with tert-butyl hydroperoxide according to the process of this invention.

In these runs, .1 mol of tert-butyl hydroperoxide, .1 mol of the chosen amine, 25 ml. of methanol and 5 ml. of water were charged to the flask of Example I and reacted for from 22–24 hours at reaction temperatures ranging from 71–76° C. The yield of amine oxide in each run was again based on reacted hydroperoxides by the method of Example I. Evaporation of the reaction mixture on a rotary evaporator was carried out as described in Example I.

In the case of tri-n-hexylamine, n-dodecyl dimethylamine, and n-octadecyldimethylamine, the residue from the rotary evaporator was only slightly soluble in water and the resulting solution formed stable emulsions with heptane during the extraction step. By replacing half of the water with methanol, both the solubility and emulsion problems were overcome, and the extraction could then be carried out employing heptane. Melting points and elemental analysis data on recrystallized picrate derivatives were obtained, and the elemental analysis figures (theoretical) given are based on a 1:1 picrate adduct.

The results of these runs are expressed in Table II.

EXAMPLE III

A series of runs was carried out in which either tri-n-propylamine, n-dodecyldimethylamine and "mixed" n-tetradecyldimethylamine, prepared by chlorinating n-tetradecane and reacting the statistically distributed mono chlorides with dimethylamine, were converted to amine oxides by reaction with various hydroperoxides according to the process of this invention.

In each of these runs, the system of Example II was used, wherein equal molar quantities of amine and hydroperoxide, 25 ml. of methanol and 5 ml. of water were utilized. The reaction temperature in each run was 71 to 75° C. The results of these runs are expressed as Table III, which gives yield data on the appropriate amine oxide based on reacted hydroperoxide.

In two additional runs, n-dodecyldimethylamine was oxidized to the amine oxide by reaction with tert-butyl hydroperoxide according to the process of this invention. As in Examples II and III, .2 mol amine, .1 mol of hydroperoxide, 25 ml. of primary alcohol and 5 ml. of water were used.

In one run in which the primary alcohol used was ethanol, the oxidation was carried out for 8 hours at 84° C. Analysis of the reaction mixture indicated the formation of 65 millimols of the amine oxide, while 123 millimols of the amine remained.

In another run in which the primary alcohol used was n-propanol, the run was carried out for 6 hours at 91° C. In this run, 55 millimols of the amine oxide were formed, and 115 millimols of unconverted amine were present in the reaction mixture.

It is within the scope of the present invention to have present in the reaction zone more than one amine and/or more than one hydroperoxide and/or more than one primary alcohol.

From the foregoing table, it is evident that with both water and primary alcohol present the yield is considerably increased. Further that a change away from primary alcohol to other solvents causes a considerable reduction in yield.

TABLE I

| Run | Solvent | Ml. | Ml. H₂O | Mols Pr₃N | Mols t-BuOOH | Reaction time, hrs. | Reaction temp., °C. | Mol percent yield Pr₃NO |
|---|---|---|---|---|---|---|---|---|
| A. Effect of Addition of H₂O or Methanol ||||||||||
| 1 | None | | None | .2 | .1 | 22 | 75–80 | 19 |
| 2 | do | | 25 | .2 | .2 | 22 | 78–80 | 22 |
| 3 | Methanol | 25 | None | .1 | .1 | 23 | 69–70 | 34 |
| 4¹ | do | 25 | 5 | .1 | .1 | 23 | 71–3 | 51 |
| B. Pr₃N/t-BuOOH Variation ||||||||||
| 5 | Methanol | 25 | 5 | .1 | .05 | 23 | 71–3 | 58 |
| 6² | do | 25 | 5 | .1 | .2 | 23 | 74–5 | 38 |
| C. Methanol/H₂O Variation ||||||||||
| 7 | Methanol | 50 | 5 | .1 | .1 | 24 | 71–3 | 59 |
| 8 | do | 50 | 8.5 | .1 | .1 | 24 | 71–3 | 58 |
| D. Variation of Reaction Time ||||||||||
| 9² | Methanol | 25 | 5 | .1 | .1 | 6 | 71–3 | 42 |
| 10 | do | 25 | 5 | .1 | .1 | 15 | 71–3 | 50 |
| E. Variation of Temperature ||||||||||
| 11² | Methanol | 25 | 5 | .1 | .1 | 24 | 60 | 54 |
| 12 | do | 25 | 5 | .1 | .1 | 24 | 73 | 52 |
| 13 | 1-propanol | 25 | 5 | .1 | .1 | 23 | 80 | 50 |
| 14 | do | 25 | 5 | .1 | .1 | 10 | 89 | 44 |
| F. Solvent Effects ||||||||||
| 15 | n-Propanol | 25 | 5 | .1 | .1 | 23 | 75–80 | 52 |
| 16 | tert-Butanol | 25 | 5 | .1 | .1 | 24 | 75–80 | 30 |
| 17 | 2-butanone | 25 | 5 | .1 | .1 | 24 | 75–80 | 23 |
| 18 | Dimethylformamide | 25 | 5 | .1 | .1 | 23 | 75–80 | 15 |
| 19 | Dimethylsulfoxide | 25 | 5 | .1 | .1 | 23 | 75–80 | 11 |
| 20 | Benzene | 25 | None | .1 | .1 | 21 | 75–80 | 20 |
| 21 | Chloroform | 25 | None | .1 | .1 | 21 | 72 | 4 |

¹ Note Run 4 contained both methanol and water.
² Incomplete hydroperoxide decomposition.

TABLE II.—AMINE OXIDES OBTAINED BY REACTION OF TERT-AMINES WITH TERT-BUTYL HYDROPEROXIDES

| Amine | Mol Percent Yield Amine Oxide¹ | Picrate M.P., °C. || Elemental Analysis of Picrates ||||||
|---|---|---|---|---|---|---|---|---|---|
| | | Lit. | Found² | Percent C || Percent H || Percent N ||
| | | | | Theory | Found | Theory | Found | Theory | Found |
| Triethyl | 75 | (³) | 184–7 | (⁴) | (⁴) | (⁴) | (⁴) | (⁴) | (⁴) |
| Tri-n-propyl | 51 | 132 | 131–2 | (⁴) | (⁴) | (⁴) | (⁴) | (⁴) | (⁴) |
| Tri-n-butyl | 57 | 111 | 110–111 | (⁴) | (⁴) | (⁴) | (⁴) | (⁴) | (⁴) |
| Triisoamyl | 54 | 99–100 | 101–2 | (⁴) | (⁴) | (⁴) | (⁴) | (⁴) | (⁴) |
| Tri-n-hexyl | 56 | 51–2 | 52–4 | (⁴) | (⁴) | (⁴) | (⁴) | (⁴) | (⁴) |
| n-Dodecyldimethyl | 70 | | 80.5–1 | 52.3 | 52.5 | 7.6 | 7.5 | 12.6 | 12.5 |
| n-Octadecyldimethyl | 79 | | 90–1.5 | 57.4 | 57.6 | 8.6 | 8.4 | 10.3 | 10.3 |
| "Mixed" n-tetradecyldimethyl⁵ | 44 | | | | | | | | |

² Potentiometrically determined pH values at endpoint (amine and amine oxides have identical endpoints within the precision of measurement (±.1 pH unit)):

Amine or Amine Oxide:      Endpoint pH
- Triethyl ----- 3.7
- Tri-n-propyl ----- 3.9
- Tri-n-butyl ----- 3.4
- Triisoamyl ----- 3.1
- Tri-n-hexyl ----- 3.7
- n-Dodecyldimethyl ----- 3.8
- n-Octadecyldimethyl ----- 3.3
- "Mixed" tetradecyldimethyl ----- 3.5

² All picrates were recrystallized from methanol or methanol-H₂O. Trihexyl amine oxide picrate was first recrystallized from chloroform/cyclohexane by seeding with tributylamine oxide picrate before the methanol recrystallization. There appears to be more than one species present in the tri-ethylamine oxide picrate.
³ 184 dec.
⁴ Not analyzed.
⁵ Prepared by chlorination of n-tetradecane and reacting the statistically distributed monochlorides with dimethylamine.

TABLE III.—TRI-N-PROPYL- AND N-DODECYLDIMETHYL-AMINE OXIDES OBTAINED FROM REACTION WITH VARIOUS HYDROPEROXIDES

| Hydroperoxide | Mols | Reaction time, hrs. | Mol Percent Yield Amine Oxide | Mol Percent Amine Remaining— |
|---|---|---|---|---|
| | | | | Tri-n-propylamine |
| tert-Butyl | .1 | 24 | 51 | (¹) |
| n-Amyl | .032 | 22 | 69 | 20 |
| 2-amyl | .047 | 24 | 82 | 15 |
| Cyclohexyl | .1 | 17 | 56 | 28 |
| Cyclohex-2-enyl | .05 | 3 | 42 | 60 |
| | .1 | 24 | 38 | 52 |
| Pentenyl ² | .07 | 19 | 73 | 11 |
| Cumyl | .1 | 24 | 64 | (¹) |
| p-Menthane | .1 | 24 | 51 | (¹) |
| | | | | n-Dodecyldimethylamine |
| t-Butyl | .1 | 23 | 70 | 19 |
| Cyclohexyl | .04 | 17 | 68 | 25 |
| Cyclohex-2-enyl | .05 | ³ 3 | 32 | 60 |
| (At 60° C.) | .05 | 1 | 32 | 62 |
| (At 45° C.) | .05 | 5 | 31 | 64 |
| (At 24° C.) | .05 | 23 | 22 | 76 |
| Pentenyl ² | .07 | 17 | 67 | 26 |
| Cumyl | .1 | 23 | 93 | 5 |
| | | | | "Mixed" n-tetradecyldimethyl-amines ⁴ |
| t-Butyl | .1 | 24 | 44 | 38 |
| Cumyl | .1 | 9 | 58 | 29 |

¹ Not run.
² 1:1 Mixture of 2- and 3-methyl-2-but-3-enyl hydroperoxides (determined by reduction with Na₂SO₃ and identifying the resulting pentenols).
³ Reaction extremely rapid.
⁴ Prepared by chlorinating n-tetradecane and reacting the statistically distributed monochlorides with dimethylamine.

Reasonable variation and modification are possible within the scope of the foregoing disclosure and the appended claims to the invention the essence of which is that N-oxides of saturated, tertiary aliphatic amine and alcohols of the formula $R_1OH$ are produced by reaction of saturated, tertiary aliphatic amines with hydroperoxides of the formula $R_1OOH$, as defined herein, and that high yields, as compared to those obtained without it, are obtained when a primary alcohol is also present in the reaction medium which also comprises water.

I claim:
1. A process for the preparation of an N-oxide of a saturated tertiary aliphatic amine and an alcohol which comprises in a reaction medium comprising water and a primary alcohol reacting a saturated, tertiary aliphatic amine with a hydroperoxide at a temperature in the range of from about 20° C. to about 100° C.

2. A process for the preparation of an N-oxide of a saturated, tertiary aliphatic amine and an alcohol which comprises in a reaction medium comprising water and a primary alcohol reacting at a temperature in the range of from about 20° C. to about 100° C. a saturated, tertiary aliphatic amine of the formula $(R_2)_3N$ and a hydroperoxide of the formula $R_1OOH$ wherein $R_2$ is an alkyl radical containing from 1–20 carbon atoms and wherein $R_1$ is a radical selected from the group consisting of alkyl, alkenyl, cycloalkyl, cycloalkenyl and alkaryl and contains 3–10 carbon atoms.

3. The reaction of tri-n-propylamine and tertiary butyl hydroperoxide in a reaction medium comprising a primary alcohol and water obtained by heating the reactant in the reaction medium at a temperature in the range of from about 20° C. to about 100° C. until a reaction ensues to produce an N-oxide of a saturated, tertiary aliphatic amine and an alcohol.

4. The reaction of tri-n-hexylamine and tertiary butyl hydroperoxide in a reaction medium comprising a primary alcohol and water obtained by heating the reactant in the reaction medium at a temperature in the range of from about 20° C. to about 100° C. until a reaction ensues to produce an N-oxide of a saturated, tertiary aliphatic amine and an alcohol.

5. The reaction of n-dodecyldimethylamine and tertiary butyl hydroperoxide in a reaction medium comprising a primary alcohol and water obtained by heating the reactant in the reaction medium at a temperature in the range of from about 20° C. to about 100° C. until a reaction ensues to produce an N-oxide of a saturated, tertiary aliphatic amine and an alcohol.

6. The reaction of n-octadecyldimethylamine and tertiary butyl hydroperoxide in a reaction medium comprising a primary alcohol and water obtained by heating the reactant in the reaction medium at a temperature in the range of from about 20° C. to about 100° C. until a reaction ensues to produce an N-oxide of a saturated, tertiary aliphatic amine and an alcohol.

7. A process which comprises reacting at a temperature in the range of from about 20° C. to about 100° C. at least one compound selected from the following:

trimethylamine,
triethylamine,
tri-n-propylamine,
methyl-di-tert-butylamine,
diethylisopropyl-amine,
tri-n-hexylamine,
tri-n-octylamine,
tri-n-decylamine,
dimethyldodecylamine,
n-eicosyldiethylamine,
di-n-octyltetradecylamine,
n-dodecyldimethylamine,
n-octadecyldimethylamine, and a hydroperoxide selected from the following:

isopropyl hydroperoxide,
tert-butylhydroperoxide,
1-pentenyl hydroperoxide,
2-pentenyl hydroperoxide,
n-hexyl hydroperoxide,
sec-octyl hydroperoxide,
tert-decyl hydroperoxide,
cyclohexylhydroperoxide,
2-cyclohexenyl hydroperoxide,
4-n-butylcyclohexyl hydroperoxide,
cumyl hydroperoxide,
benzyl hydroperoxide,
4-methylcumyl hydroperoxide, in a reaction medium comprising water and a primary alcohol to produce an N-oxide of a saturated, tertiary aliphatic amine and an alcohol.

8. A process according to claim 7 wherein the alcohol is selected from the following:

methanol,
ethanol,
n-propanol,
n-butanol,
n-pentanol,
n-hexanol,
ethylene glycol,
1,2-propylene glycol,
1,3-propylene glycol,
butane-1,4-diol,
hexane-1,6-diol,
glycerol.

References Cited

UNITED STATES PATENTS 3,197,509   7/1965   Drew et al.

FOREIGN PATENTS

Y109IVb/12q   2/1956   Germany.

OTHER REFERENCES

Fieser et al.: Advanced Organic Chemistry, Reinhold, N.Y. (1962), pp. 126 and 127.

CHARLES B. PARKER, *Primary Examiner.*

R. L. RAYMOND, *Assistant Examiner.*